United States Patent [19]

Rubinstein

[11] Patent Number: 4,515,232
[45] Date of Patent: May 7, 1985

[54] PLATFORM TRANSDUCER BEAMS
[75] Inventor: Randall B. Rubinstein, Sharon, Mass.
[73] Assignee: Hottinger Baldwin Measurements, Inc., Framingham, Mass.
[21] Appl. No.: 548,989
[22] Filed: Nov. 7, 1983
[51] Int. Cl.³ .......................... G01G 23/02; G01G 3/14
[52] U.S. Cl. ........................................ 177/154; 177/211
[58] Field of Search ................................ 177/154–156, 177/211, 229; 73/862.65, 862.66

[56] References Cited
U.S. PATENT DOCUMENTS 3,486,373 12/1969 Scott ............................... 177/229 X
3,826,145 7/1974 McFarland ..................... 177/211 X
4,095,659 6/1978 Blench et al. ................... 177/154 X
4,143,727 3/1979 Jacobson ......................... 177/229 X
4,166,997 9/1979 Kistler ........................... 73/862.65 X
4,261,429 4/1981 Lockery ......................... 73/862.65 X
4,338,825 7/1982 Amlani et al. ................. 73/862.65
4,467,661 8/1984 Somal ............................... 177/229 X Primary Examiner—George H. Miller, Jr.
Attorney, Agent, or Firm—W. G. Fasse; D. H. Kane, Jr.

[57] ABSTRACT

Conventional transducer beams, and in particular platform load cells, can be simply and economically protected from accidental damage that may be incurred during handling and shipping. Safety screws, preferably of high strength plastic, are inserted in threaded holes that are drilled through the transducer beam so that the screws take up substantial portions of accidental loads, thereby protecting the fragile sensing sections of the transducer beam. The safety screws are to be left in place until the units are incorporated into respective platform type scales and the scales are installed for their ultimate use.

6 Claims, 3 Drawing Figures

U.S. Patent  May 7, 1985  4,515,232
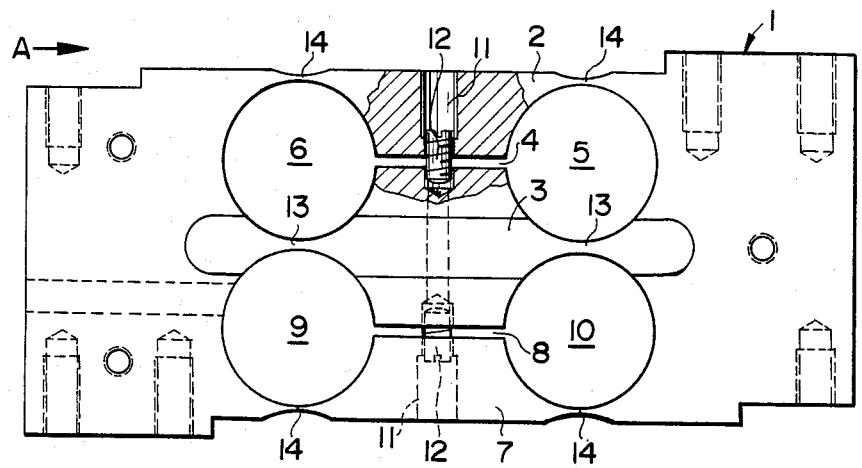
FIG. 1
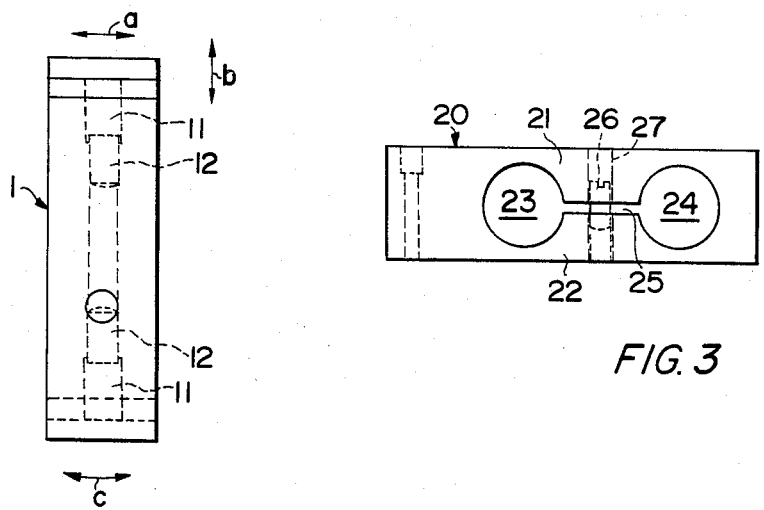
FIG. 2
FIG. 3

PLATFORM TRANSDUCER BEAMS

FIELD OF THE INVENTION

The present invention relates to an improvement in platform transducer beams, and in particular in platform load cells (PLCs). The improvement protects these PLCs from damage that may be caused during handling or shipping of the PLCs.

PLCs are strain gage transducer beams which may be secured to a platform in many different arrangements to form a scale. Typically, a platform structure is supported in each corner by a single transducer beam arranged between the platform and a base. The transducer beams are provided with strain gages which change in electrical resistance in response to strain which is thus measured by a suitable bridge circuit.

The PLCs are machined out of a single piece of metal to precise specifications and perform very well with regard to linearity, hysteresis, and creep. However, the lower capacity units (0.5 to 20 lbs.) are somewhat susceptible to damage during handling and/or shipping. This damage may occur at any manufacturing or processing step starting after the machining operation and including anodizing or plating, wiring, and testing operations. Especially the very low capacity 0.5, 1, 2, and 5 lb. units, which are rather delicate, are subject to this trouble. Considerable efforts have been made to protect these delicate units during processing, but these efforts have not been very successful.

OBJECTS OF THE INVENTION

In view of the foregoing it is the aim of the invention to provide an improvement in platform transducer beams that will simply and cheaply protect the transducer beams from damage during processing and shipment. Such protection shall be available until a scale equipped with such PLCs reaches its final destination.

SUMMARY OF THE INVENTION

According to the invention holes are drilled and threaded through the transducer beam at least at one critical location and a safety screw or screws serve to secure beam sections of the whole transducer beam to each other. The transducer beam comprises at least two beam sections rigidly connected to each other at their respective ends. These sections are separated from each other by a narrow slot formed by machining or milling. This slot allows the transducer beam to bend at its sensing or flexing portions in such a way that strain gages secured to the flexing portions can measure strain. The threaded holes are drilled so that the safety screws pass through the slot or slots for securing the beam sections, on either side of a slot to each other. The addition of these threaded holes in no way compromises the performance of the transducer beam. Adding safety screws results in a much stronger structure in regard to loads that may be accidentally applied to the transducer beam during handling or shipping.

BRIEF FIGURE DESCRIPTION

In order that the invention may be clearly understood, it will now be described, by way of example, with reference to the accompanying drawings, wherein:

FIG. 1 shows a side view partially in section of a double bending beam transducer of the platform load cell type improved according to the present invention;

FIG. 2 shows a view in the direction of arrow A in FIG. 1 and illustrating the directions relative to which the transducer beam has been made insensitive; and FIG. 3 shows another type of transducer beam improved according to the present invention.

DETAILED DESCRIPTION OF PREFERRED EXAMPLE EMBODIMENTS AND OF THE BEST MODE OF THE INVENTION

FIG. 1 shows a typical platform load cell 1 manufactured from a single block and comprising beam sections 2 and 3 separated by a slot 4 and drilled holes 5 and 6, and beam section 7 separated from beam section 3 by a slot 8 and drilled holes 9 and 10.

In the implementation of this invention, the holes 11 are drilled and tapped during the machining of the PLC, before the slots 4 and 8 are cut. Then, just before removing the PLC from the holding jig, the two safety screws 12 of the set screw type are inserted into the holes 11. These screws preferably are made of a suitable high strength plastic material such as nylon. A plastic safety screw is advantageous because it can be installed immediately after machining and can be left in place during the subsequent anodizing or plating operations and during any following manufacturing, assembling and shipping operations, except during testing.

In FIG. 2 the arrows a, b and c show the directions of adverse loads that could damage a load cell during handling. According to the invention, when the two safety screws 12 are in place, the entire structure of the PLC becomes stronger. The PLC is protected against adverse loads that can be accidentally applied to the PLC during handling, particularly in the directions shown by arrows a, b and c. Through the simple expedient of adding the safety screws 12, a substantial portion of the loads a, b and c is taken up by the screws 12 which prevent transmitting of these forces to the sensing sections 13 and 14 carrying the strain gages not shown.

FIG. 3 shows another transducer beam 20 with two beam sections 21 and 22 separated by drilled holes 23 and 24 and by slot 25. A single safety screw 26 can be installed in a threaded hole 27 to secure the transducer beam against accidental handling damage.

As mentioned, the safety screws 12, 26 are left in place during all of the manufacturing operations after the initial machining, except when the units are tested. Testing requires only a short period of time and is performed by skilled operators, so there is less danger of damage during testing. After testing, the safety screws are reinserted to greatly reduce the susceptibility of the units to damage during shipment. The screws may be, or rather should be, left in the PLCs even after these units are incorporated in platform type scales. The user of the scale can then remove the safety screws after the scale is installed or in place at its final destination.

By adding safety screws to the transducer beams according to the teaching of the invention, a feature is provided that greatly reduces the susceptibility of the PLC units to damage due to handling in the machine shop and through subsequent operations prior to the ultimate use by the final customer, without compromising the performance of the units.

Although the invention has been described with reference to specific example embodiments, it will be appreciated that it is intended to cover all modifications and equivalents within the scope of the appended claims.

What is claimed is:

1. A device for protecting a platform load cell having at least one slot between two load cell sections, against damage, comprising a threaded hole having axially aligned hole portions on both sides of said slot in each load cell section, and a removable safety screw in both hole portions, said removable safety screw extending through said slot to interconnect said load cell sections substantially rigidly with each other prior to any sensing function to be performed by said load cell.

2. The device of claim 1, wherein said safety screw is made of plastics material.

3. The device of claim 1, wherein said load cell has two slots forming three load cell sections, two threaded holes, each hole extending across its respective slot, and a removable safety screw in each hole, each removable screw extending across its respective slot for substantially rigidly interconnecting all three sections of the load cell.

4. The device of claim 3, wherein each safety screw is made of plastics material.

5. A method for protecting a platform load cell having a number of sections, against damage during manufacture, transport and mounting comprising the following steps: drilling at least one hole into said sections, providing the hole with a threading, machining a slot into the load cell for separating said sections and so that the slot extends through the threaded hole, and inserting a screw into the threaded hole so that the screw interconnects the adjacent load cell sections substantially rigidly until the screw is removed again.

6. The method of claim 5, further comprising making said screw of plastics material as a set screw.

* * * * *